Feb. 5, 1952  E. M. WILLIAMS  2,584,175
PHOTOGRAPHIC WAVEFORM RECORDER FOR CATHODE-RAY TUBE INDICATORS
Filed Aug. 4, 1944  2 SHEETS—SHEET 1

INVENTOR.
EVERARD M. WILLIAMS
BY
ATTORNEY

INVENTOR.
EVERARD M. WILLIAMS
BY William D. Hall
ATTORNEY

Patented Feb. 5, 1952

2,584,175

UNITED STATES PATENT OFFICE 2,584,175

PHOTOGRAPHIC WAVEFORM RECORDER FOR CATHODE-RAY TUBE INDICATORS

Everard M. Williams, Dayton, Ohio

Application August 4, 1944, Serial No. 548,129

8 Claims. (Cl. 346—110)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to equipment for photographically recording the electrical wave forms appearing in various types of electronic equipment. More particularly, my invention relates to equipment for the photographing of the electrical wave forms of signals being studied in a pulse analyzer.

The pulse or wave form analyzer is usually equipped with a cathode ray tube for visually indicating the shape of the pulse or wave form being studied. Often times it is desirable to make a permanent recording of the electrical wave form or pulse being analyzed, so that a more detailed study may be made. Or, due to the fact that the electrical wave form to be studied may be existent over so short a period of time that a visual analysis cannot be made in the brief period that the electrical wave form or pulse appears on the screen of the cathode ray tube, it becomes desirable to photographically record the trace appearing on the screen of the cathode ray tube of the pulse or wave form analyzer.

Heretofore, the photographic recording of traces appearing on the screen of a cathode ray tube has necessitated a bulky and make-shift arrangement since such recording was usually done in large fixed installations such as are used in laboratories. The usual procedure in the past has been to mount the camera upon a tripod or other holder so that the camera was as close to the cathode ray tube as possible, whereby the operator had to divide his time between the oscilloscope and the camera. Another arrangement utilizes a hand carried camera that is held up to the screen of the cathode ray tube and the photograph taken at an opportune moment. Obviously such arrangements are highly unsatisfactory when it becomes necessary to photographically record hundreds of different traces which may sequentially appear on the cathode ray tube for very brief periods of time, or where the operator must operate the analyzer as well as the photographic device. My invention makes it possible to record a large number of different traces in the briefest period of time without the necessity of any manual manipulation of the photographic device.

It is an object of my invention to provide a device to be used in conjunction with electrical wave or pulse analyzing equipment to photographically record the electrical wave forms or pulses appearing in the analyzer.

It is a further object of my invention to provide a photographic recording device that will photographically record the trace appearing on the screen of a cathode ray tube, such recording to be made without the use of lenses.

It is another object of my invention to provide a device that will quickly and easily photographically record a great number of different wave forms appearing sequentially on the screen of a cathode ray tube.

It is a further object of my invention to provide a "shutterless" system of photographing traces appearing upon the screen of a cathode ray tube.

It is still another object of my invention to provide a system of photographing traces appearing on the screen of a cathode ray tube by utilizing an "electric shutter" which has no mechanical inertia.

These and other objects are obtained by the novel structure and arrangement hereinafter described and illustrated in the accompanying drawings in which Figure 1 is a block diagram of my invention;

In general, my invention comprises a compact unit utilizing two cathode ray tubes, one of which is visible to the operator and the other of which faces a photographic device. The tube which faces the operator is always in an unblanked condition, while the cathode ray tube facing the photographic device is normally in a blanked condition. When the operator focuses the trace on the tube facing him, it is automatically focused on the blanked tube which may then be unblanked for the purpose of photographing the trace.

Figure 1:
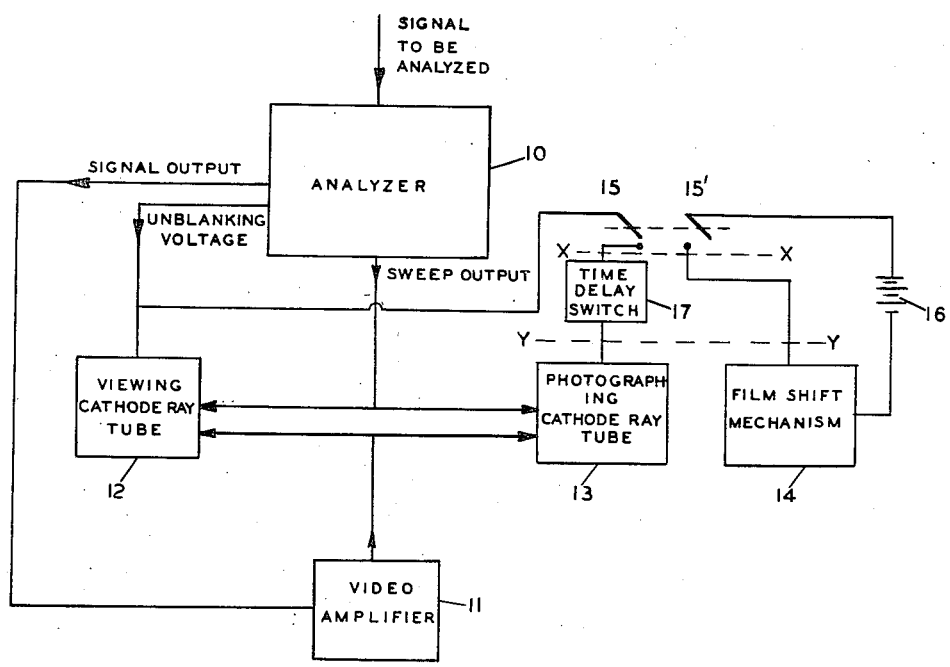
Figure 1A is a modification between lines $x$—$x$ and $y$—$y$ of Figure 1.

Referring to Figure 1 which is a block diagram of one embodiment of my invention, it is seen that there are two cathode ray tubes 12 and 13 which are connected in parallel to an electrical wave form analyzer 10 from which cathode ray tubes 12 and 13 receive their sweep voltages.

The signal or wave form to be analyzed is fed through analyzer 10 to a video amplifier 11 and then to each of the cathode ray tubes 12 and 13. An unblanking voltage is fed directly from the analyzer 10 to cathode ray tube 12, while the same voltage is fed through the switch 15, time delay switch 17, and then to cathode ray tube 13. The tube 13 is normally in a blanked condition and is unblanked by the closing of switch 15. The film shift mechanism 14 is operated from voltage source 16 upon the closing of switch 15'. Switches 15 and 15' are interconnected or ganged. Thus the operator first focuses the desired trace upon the screen of cathode ray tube 12 and upon closing the ganged switches 15 and 15', the film shift mechanism 14 operates first and moves an unexposed portion of photographic film into position. After a period of time, which is chosen to be sufficient to permit the film shift mechanism 14 to operate, the time delay switch 17 closes and permits the unblanking voltage from analyzer 10 to unblank the cathode ray tube 13. The trace appearing upon the screen of cathode ray tube 13 is automatically photographed in a manner explained in detail below.

Figure 2:
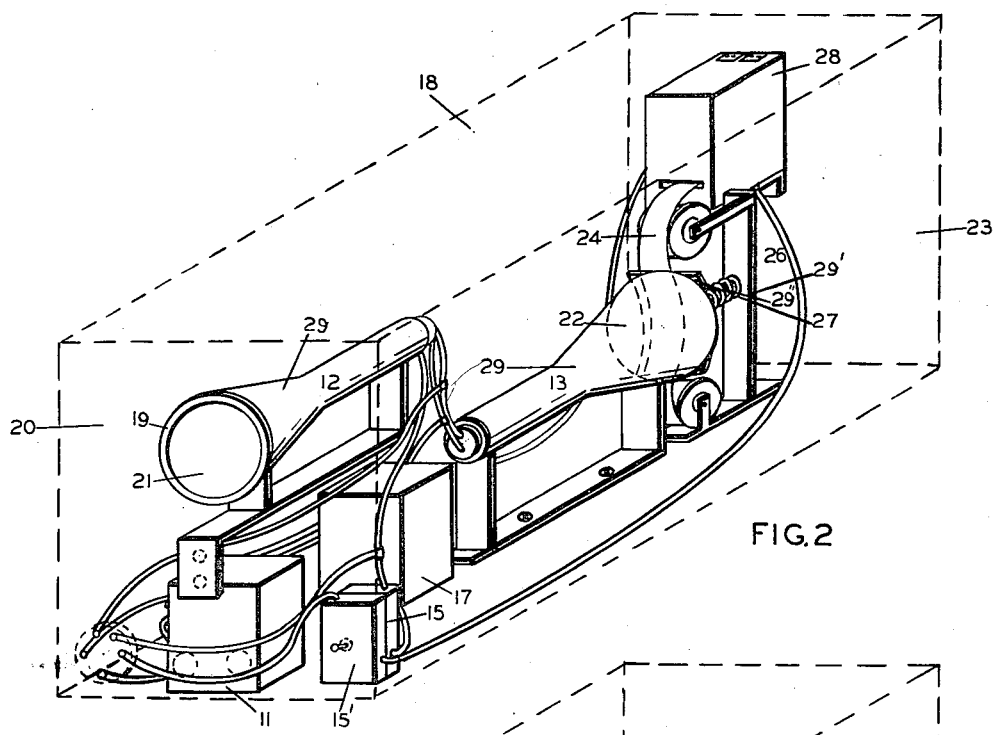
Figure 2 is a phantom perspective view of one embodiment of my invention.

Referring to Figure 2 which discloses one embodiment of my invention, 18 is a light-tight cabinet for housing the entire device. The cathode ray tube 12 is situated within the cabinet 18 so that its screen 21 is visible through a circular opening in the front wall 20. The circular opening may be fitted with a gasket 19 so that tube 12 may be held tightly thereagainst and form a light-tight fit. The normally blanked tube 13 is situated beneath tube 12 so that its screen 22 faces towards the rear wall 23 of the cabinet 18. Photographic film 24 is unrolled from the reel 25 over pulley 26 into the film shift mechanism 28. The film shift mechanism 28 may be any one of those known and used in the photographic art to shift an unexposed section of film into position. The film shift mechanism 28 is of the type that moves one portion of unexposed film into position upon the closing of switch 15'. Film 24 is held in contact with the outer face of tube 13 by the backing plate 27 which is urged forward by spring 29'' mounted on standard 29'. In order to prevent stray light from striking the film and to also prevent any stray magnetic or electrical fields from acting upon the cathode ray tubes, each tube is equipped with a close fitting metallic shield 29.

In the operation of this device, the operator focuses the desired trace upon the screen 21 of cathode ray tube 12. Since cathode ray tube 13 is connected in parallel to tube 12, the wave form will also be focused in tube 13 but no trace will appear on the screen of that tube because the tube is held in a normally blanked condition. Blanking may be accomplished by biasing the grid of cathode ray tube 13 beyond cutoff. The closing of switches 15 and 15' first causes the film shift mechanism 28 to move an unexposed portion of the film 24 into proper position contacting the screen 22 of cathode ray tube 13. After a sufficient time interval to permit the film shift to take place, the time delay switch 17 closes, causing the cathode ray tube 13 to become unblanked. This permits a trace to appear on screen 22 which is immediately recorded on the film 24. The cathode ray tube 12 may be termed the "viewing" tube since it functions in a manner similar to the view finder or ground glass viewer on a camera. Also, whatever trace is seen on screen 21 will be photographically recorded when switches 15 and 15' are closed. The blanking and unblanking of tube 13 takes the place of a shutter in the photographic portion of the device and may properly be termed an electrical shutter, since it has no moving parts subject to inertia, mechanical defects and other drawbacks.

Figure 3:
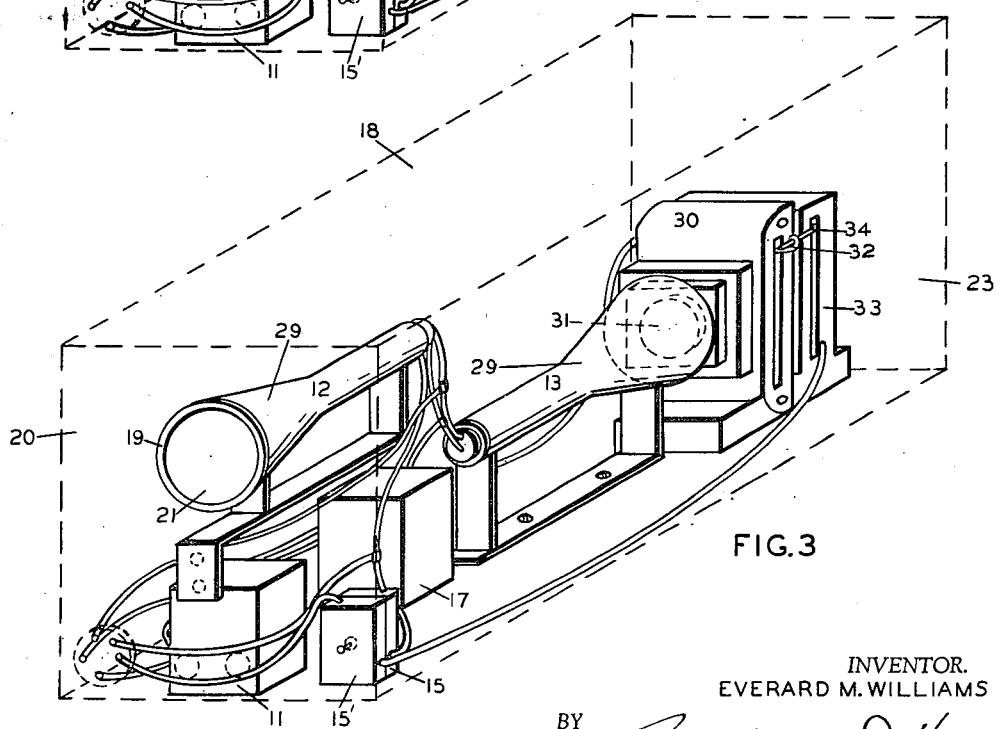
Figure 3 is a phantom perspective view of another embodiment of my invention.

The modification disclosed in Figure 3 is similar in arrangement to that shown in Figure 2 with the exception that a shutterless camera 30 has been substituted for the photographic means of Figure 2. The camera 30 may be of conventional design with the shutter mechanism removed and having a lens 31 of a diameter approximately equal to about two thirds of the diameter of the cathode ray tube screen 22 which is to be photographed. The camera 30 is placed at such distance from the screen 22 of cathode ray tube 13 that an image of the screen is properly focused on the film in the camera. The camera 30 may be of the type which has a film shift lever 30, actuation of which by an electrically operated reciprocating means 33 through connecting link 34, will move an unexposed portion of film into proper position.

The operation of this modification is in all respects similar to the one shown in Figure 2. The operator focuses the desired trace upon the screen of viewing cathode ray tube 12 and when the desired trace is focused the switches 15 and 15' are closed thus first operating the actuator 33, which through connecting link 34, operates the film shift lever 32, bringing into proper position a portion of unexposed film. After a fixed period of time the time delay switch 17 permits the unblanking voltage to reach cathode ray tube 13 thus causing a trace to appear on its screen which is immediately photographed on the film.

Figure 1A:
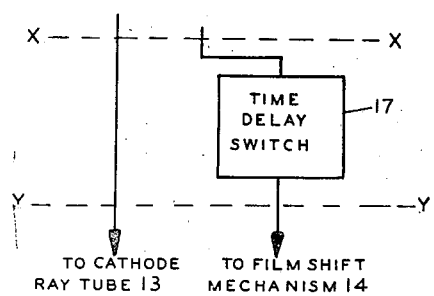

The modification shown in Figure 1A is similar to that shown in Figure 1 with the exception that the time delay switch is placed in the circuit of the film shift mechanism 14, and the unblanking voltage is fed directly from the contact of the switch 15 to the cathode ray tube 13.

In the operation of the system disclosed in Figure 1A, the operator focuses the desired trace upon the screen of the cathode ray 12 and closes the switches 15 and 15'. The cathode ray tube 12 is unblanked immediately and a photograph of the screen of the cathode ray tube 13 is taken instantly. After a period of time the time delay switch 17 closes and permits the film shift mechanism 14 to move an unexposed portion of film into position for the next photograph. The mechanical arrangement of parts for the modification shown in Figure 1A would be exactly like that shown in Figures 2 and 3 with the exception that the time delay switch 17 would be placed in the film shift mechanism circuit instead of the unblanking voltage circuit to the cathode ray tube 13.

Still another modification which could be made would be to utilize a shutterless motion picture camera for the photographic recording means and to omit the time delay switch altogether so that when the cathode ray tube 13 is unblanked, the motion picture camera begins operation, and stops operation when the cathode ray tube becomes blanked.

Although I have illustrated my invention as being used with a pulse analyzer it is obvious that it may be used for photographically recording any wave form which may be shown upon the screen of a cathode ray tube.

The above description is to be considered as illustrative and not as limiting the invention of which modifications may be made without departing from the scope of the invention as set forth in the appended claims.

Having thus descibed my invention, I claim:

1. In a signal analyzing system, two cathode ray tubes connected in parallel, means for simultaneously applying the same signal and sweep potentials to said two tubes, means to maintain one of said tubes in a normally unblanked condition and the other of said cathode ray tubes in a normally blanked condition, photographic means facing the screen of said normally blanked cathode ray tube and including an intermittent film shifting mechanism, a circuit for actuating said film shift mechanism, a circuit for unblanking said normally blanked cathode ray tube, and unitary means for sequentially closing said circuits.

2. In a signal analyzing system, two cathode ray tubes connected in parallel, means for simultaneously applying the same signal and sweep potentials to said two tubes, means to maintain one of said tubes in a normally unblanked condition and the other of said cathode ray tubes in a normally blanked condition, photographic means including an intermittent film shifting mechanism facing the screen of said normally blanked cathode ray tube, and unitary means to first actuate said film shift mechanism and then to unblank said normally blanked cathode ray tube.

3. In a signal analyzing system, two cathode ray tubes connected in parallel, means for simultaneously applying the same signal and sweep potentials to said two tubes, means to maintain one of said tubes in a normally unblanked condition and the other of said cathode ray tubes in a normally blanked condition, photographic means including an intermittent film shifting mechanism facing the screen of said normally blanked cathode ray tube, and unitary means to first unblank said normally blanked cathode ray tube and then to actuate said film shift mechanism.

4. In an analyzing system, two cathode ray tubes connected in parallel to the same sources of signal and sweep potentials, means to maintain one of said tubes in a normally unblanked condition and the other of said tubes in a normally blanked condition, means including a film for photographing the screen of said other tube, a first electric circuit means independent of said signal potentials for intermittently advancing unexposed film in front of said screen, a second electric circuit means independent of said first circuit means for unblanking said normally blanked cathode ray tube, and unitary switch means for sequentially controlling the operation of said first and second circuit means.

5. In a signal analyzer system, two cathode ray tubes connected in parallel, means for simultaneously applying the same signal and sweep potentials to both of said tubes, means to maintain one of said tubes in a normally unblanked condition and the other of said tubes in a normally blanked condition, a movable photographic film, a portion of which is pressed against the face of said other tube, means for intermittently unblanking said other tube, and means for moving another portion of said film against the face of said other tube during the periods between the intermittent unblanking periods.

6. In a signal image display system, the combination of a pair of cathode ray tubes and means to display the same image on the screens of both tubes, means to normally maintain one of said tubes in unblanked condition, the other tube being normally maintained in blanked condition, means for intermittently photographing the image of said other tube, comprising a first circuit means for intermittently positioning photographic film in front of the screen of said other tube, a second circuit means for unblanking said tube, means to simultaneously close both circuit means, and means in one of said circuit means to increase its time constant relative to that of the other, whereby unblanking and film positioning occur successively.

7. A system as set forth in claim 6, wherein both of said tubes have a pair of orthogonally-related beam-deflecting means, means to impress the same signal to be displayed on one of the deflecting means of each tube, and means to impress the same sweep voltage on the other deflecting means of each tube to provide like time bases on said tubes.

8. The system of claim 6, in which said last-named means includes a time delay switch to provide said larger time constant.

EVERARD M. WILLIAMS.

REFERENCES CITED

The following references are of record in the file of this patent:

UNITED STATES PATENTS

| Number | Name | Date |
| --- | --- | --- |
| 2,222,943 | George | Nov. 26, 1940 |
| 2,251,786 | Epstein | Aug. 5, 1941 |
| 2,275,898 | Goldsmith | Mar. 10, 1942 |
| 2,294,015 | Salb | Aug. 25, 1942 |
| 2,415,870 | Ryder | Feb. 18, 1947 |
| 2,420,029 | Brady | May 6, 1947 |
| 2,457,744 | Sturm | Dec. 28, 1948 |